US012134925B2

(12) United States Patent
Liermann

(10) Patent No.: US 12,134,925 B2
(45) Date of Patent: Nov. 5, 2024

(54) DOOR HINGE

(71) Applicant: Nicolas Liermann, Rheda-Wiedenbrueck (DE)

(72) Inventor: Nicolas Liermann, Rheda-Wiedenbrueck (DE)

(73) Assignee: SIMONSWERK GMBH, Rheda-Wiedenbrueck (DE)

( * ) Notice: Subject to any disclaimer, the term of this patent is extended or adjusted under 35 U.S.C. 154(b) by 15 days.

(21) Appl. No.: 17/963,229

(22) Filed: Oct. 11, 2022

(65) Prior Publication Data

US 2023/0151660 A1 May 18, 2023

(30) Foreign Application Priority Data

Nov. 16, 2021 (DE) ......................... 102021129905.5

(51) Int. Cl.
*E05D 3/06* (2006.01)
*E05D 3/12* (2006.01)
*E05D 7/04* (2006.01)

(52) U.S. Cl.
CPC ................ *E05D 7/04* (2013.01); *E05D 3/12* (2013.01); *E05D 2007/0469* (2013.01); *E05Y 2600/41* (2013.01); *E05Y 2900/132* (2013.01)

(58) Field of Classification Search
CPC .... E05D 3/06; E05D 3/12; E05D 3/14; E05D 3/142; E05D 3/16; E05D 3/125; E05D 3/127; E05D 3/185; E05D 3/186; E05D 7/04; E05D 7/0423; E05D 7/0415; E05D 7/043; E05D 7/0027; E05D 7/0045; E05D 5/02; E05D 5/0215; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05D 9/00; E05Y 2600/41; E05Y 2600/634; E05Y 2600/412; E05Y 2600/45; E05Y 2600/452; E05Y 2600/46; E05Y 2600/51; E05Y 2900/132; E05Y 2900/20; E05Y 2900/50; E05Y 2900/531; E05Y 2900/546; E05Y 2201/624; E05Y 2201/638; E05Y 2800/45; E05Y 2800/674; E05Y 16/366; E05Y 16/368; E05Y 16/236; E05Y 16/237

See application file for complete search history.

(56) References Cited

U.S. PATENT DOCUMENTS 5,755,011 A * 5/1998 Green .................. E05D 7/0423 16/241
5,799,370 A * 9/1998 Davidian ............. E05D 7/0415 16/241

(Continued)

FOREIGN PATENT DOCUMENTS

EP 2450512 A1 * 5/2012 ............ E05D 3/183
WO WO-2010143405 A1 * 12/2010 ............... E05D 3/12

*Primary Examiner* — Chuck Y Mah
(74) *Attorney, Agent, or Firm* — Andrew Wilford

(57) ABSTRACT

A door hinge has a first leaf assembly having a base frame, a second leaf assembly, and a link assembly connecting the leaf assemblies pivotally to each other. A first end of the link is pivoted on the seat block in the first leaf assembly. The seat block is movable in the base frame for adjustment in a first direction, and a guide formation preventing movement of the seat block in a second direction relative to the base frame.

14 Claims, 4 Drawing Sheets

(56) References Cited

U.S. PATENT DOCUMENTS

| | | | |
|---|---|---|---|
| 10,273,730 | B2 | 4/2019 | Liermann |
| 2008/0263822 | A1* | 10/2008 | Sabrowski ............ E05D 7/0423 16/236 |
| 2012/0117757 | A1* | 5/2012 | Oshima ................. E05D 7/0423 16/236 |
| 2013/0014345 | A1* | 1/2013 | Park .......................... E05D 5/06 16/248 |
| 2017/0030122 | A1* | 2/2017 | Dreisewerd ............. E05D 3/186 |
| 2017/0130497 | A1* | 5/2017 | Yamaguchi ............... E05D 3/16 |
| 2019/0071904 | A1* | 3/2019 | Migliorini ............. E05D 7/0415 |
| 2019/0071905 | A1* | 3/2019 | Migliorini ................. E05D 9/00 |
| 2019/0071906 | A1* | 3/2019 | Migliorini ............. E05D 7/0423 |

* cited by examiner

DOOR HINGE

FIELD OF THE INVENTION

The present invention relates to door hinge. More particularly this invention concerns a concealed door hinge.

BACKGROUND OF THE INVENTION

A typical concealed door hinge is known for example from U.S. Pat. No. 10,273,730. Accordingly, a door hinge is provided in which a so-called pressure adjustment is made possible such that the link needed for the pivoting is fastened to a seat block that can be moved relative to a base frame. For this slots are provided in which a screw head of an adjustment fastener is positively guided and whereby, after loosening the adjuster, the two leaf assemblies can be moved relative to each other. After reaching an optimal position the adjuster can be tightened again and the position locked.

Such a design has basically proven itself. However adjustment of the seat block in the base frame of the leaf assembly is only possible if the adjuster required for locking is loosened. The load of the door panel then tilts the seat block such that adjustment of the leaf assemblies to each other is made more difficult or under circumstances is even prevented. At the same time, the load of the door panel during locking must be absorbed via the adjuster to a certain extent, so the adjuster is subject to considerable stress.

OBJECTS OF THE INVENTION

It is therefore an object of the present invention to provide an improved door hinge.

Another object is the provision of such an improved door hinge that overcomes the above-given disadvantages, in particular that distinguishes itself from the prior art of the known door hinges by an improved adjustment function and at the same time is simple to install.

SUMMARY OF THE INVENTION

A door hinge has according to the invention a first leaf assembly having a base frame, a second leaf assembly, a link connecting the leaf assemblies pivotally to each other, a seat block in the first leaf assembly and on which a first end of the link is pivoted. The seat block is movable in the base frame for adjustment in a first direction, and a guide formation preventing movement of the seat block in a second direction relative to the base frame.

According to a preferred embodiment of the invention the base frame has at least a groove extending along the first direction and in which engages at least a complementary formation, the groove forming a sliding seat that has a greater length than the length of the complementary formation. Here the length of the groove runs along the first direction and thereby enables adjustment of the seat block in the base frame of the first leaf assembly. At the same time the guide formation fits complementarily in the groove with respect to the second direction so that at the same time a sliding fit in the first direction is formed and a positive holding in a second direction is enabled. During of relative movement or displacement of the seat block in the base frame, the seat block cannot tilt with respect to the base frame since the guide formation is held in the base frame.

The groove can be basically formed in various ways, but it is sufficient if a recess is formed in the base frame. Preferably the groove however is an opening in the base frame, where opening is meant to be one whereby the groove extends completely through the base frame and has a depth, which corresponds to the material thickness of the base frame at this location.

Furthermore, is preferably provided, that the groove is formed in a side wall of the base frame. According to a particularly preferred embodiment this occurs at a transition to a rear wall.

In order to enable as even as possible support of the seat block in the base frame, it is preferably provided that at least two guide formations are provided that on the one hand enable support in a upper and on the other hand in a lower region of the leaf assembly. This is relative to the usual installation situation of the door hinge, so that the upper and lower sections refer to the first vertical direction. Such support can for example be achieved in that two guide formations are provided. Alternatively the guide formation extends over a comparatively long region within the guide groove, so that both the guide groove and the guide formation have a comparatively large extension in the first direction.

Preferably, however, the seat block has at least two grooves in each of which fits a respective complementary guide formation of the seat block. The two grooves are then typically spaced from each other in a first direction, the spacing being between 40 and 70 mm, preferably between 50 and 60 mm. The grooves themselves each have a length between 8 and 20 mm, preferably between 12 and 16 mm.

As described above, the grooves form in combination with the complementary guide formations and/or with the ridge formations a sliding seat allowing adjustment of the relative position of the seat block in the base frame with respect to a first direction. Against this background the guide formations have a length extending along the first direction, which is smaller than the length of the groove and in which engages the corresponding guide formation. The difference between of the length of the groove and of the length of the complementary guide formation forms then basically the maximum possible adjustment travel, whereby it naturally also is in the scope of the invention that the actual adjustment path is smaller than the maximum allowed by the groove and the form-fit shaping predetermined adjustment path. According to of a preferred embodiment, the guide formation has a length between 5 and 10 mm, preferably between 6 and 8 mm.

In order to lock the seat block in the base frame locking means are preferably provided, in which case especially preferable is at least a screw fastener. With the help of this screw fastener then the seat block can be fixed to the base frame. For this it suffices in principle if only a screw fastener is provided. Preferably for this however two screw fasteners are provided, one in an upper and another in a lower section of the base frame. For adjustment of the seat block in a first direction these screw fasteners are loosened to such an extent that the seat block slides freely on the base frame, whereby the positive connection between the seat block and the base frame prevents tilting of the seat block. Then the seat block is adjusted to the desired position and is locked by tightening the screw fastener or the screw fasteners.

According to a preferred further development of the invention the seat block has at least one slot in which a respective screw fastener is guided in a loosened state along the first direction. Accordingly the slot is a kind of constrained guide for the bolted joint where the length of the slot is so dimensioned that the desired adjustment path can be achieved. The screw fastener is at least partially in the slot so that the length of the slot and the diameter of the part of the screw fastener in the slot determine the maximum possible adjustment travel. Basically the difference between the length of the slot and the diameter of the screw head can correspond to the difference between the groove length and the length of the guide formation. However, an alternative embodiment provides that the difference between the length of the slot and the screw head is less. The slot is further preferably so formed that only in loosed state is movement of the screw fastener possible within the slot in a first direction. Lateral adjustment in a third direction is prevented in this case in that the width of the slot essentially coincides with the diameter of the screw fastener, whereby of course a certain tolerance must be taken into account, so that the screw fastener slides freely in the slot. If a total of two or more screw fasteners are provided for locking of the seat block, this applies correspondingly also to all of the slots, whereby preferably in both an upper and a lower section of the seat block such a slot is provided, via which then the seat block can be locked in the upper and lower section of the base frame.

A configuration is preferable whereby the seat block is stepped so that the lower and the upper portion of the seat block project oppositely from a middle portion in a second direction.

The link can in principle be attached directly to the seat block. However, according to a preferred embodiment an upper and a lower mount are detachably attached to the seat block, and the at least one link is rotatably mounted on the mounts. Such an embodiment has the advantage that during assembly the link first is set between the mounts and together therewith the link can be fastened to the respective leaf assembly.

Although in the context of the invention an arrangement with only a link is sufficient, the invention is not limited to such an arrangement. Thus it is for example conceivable, that an arrangement of two links formed rotatable to each other is provided, and both links are at least rotatably mounted on the mounts.

Subject of the invention is further a door with a panel and a door frame as well as a door hinge according to the invention that connects the door panel pivotally on the frame.

According to one such embodiment preferably the leaf assemblies are each inserted in a respective mortise in the narrow side of the door panel and a reveal side of the door frame.

Depending on design and weight of the door panel moreover several door hinges may be provided between the door panel and the door frame. Preferably at least an upper and a lower door hinge are provided. With one particularly heavy execution of the door panel can be provided in addition, also three or more door hinges.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
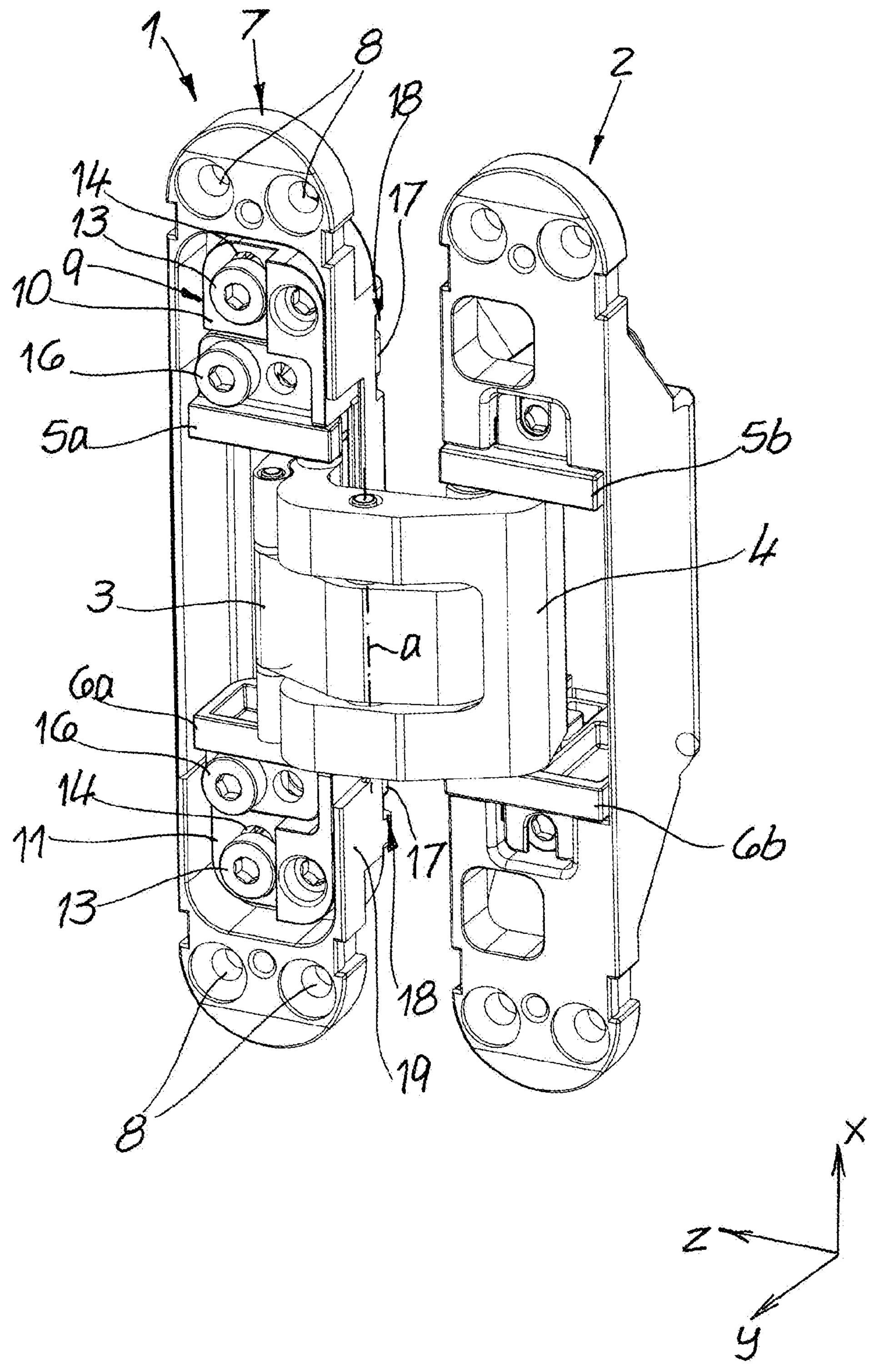
FIG. 1 is an isometric view of the door hinge according to the invention.

FIG. 1 shows the door hinge according to the invention with a first leaf assembly 1 and a second leaf assembly 2, the first leaf assembly 1 being mounted in a mortise in a reveal side of an unillustrated door frame and the second leaf assembly 2 in a mortise in an edge of an unillustrated door panel. This is thus a concealed arrangement of the door hinge between the door panel and the door frame with the components of the door hinge in a closed state of the door not visible from outside. This applies equally also for the pivot assembly that pivots the leaf assemblies 1, 2 on each other.

The leaf assemblies 1, 2 are pivoted on each other via a link arrangement consisting of a first link 3 and a second link 4 that are rotatably connected to each other at an axis a parallel to a first vertical direction x. Furthermore the two links 3, 4 are rotatable on the respective leaf assemblies 1, 2, the second link 4 being only rotatable and the first link 3 being both rotatable as well as longitudinally movable in the second leaf assembly 2. The second link 4 consists moreover of two pivotally interconnected to each other link parts, a first link part being mounted in the first leaf assembly 1 and a second link part being mounted in the second leaf assembly 2.

For connection of the links 3, 4, the leaf assemblies 1, 2 have respective upper mounts 5*a*, 5*b* and lower mounts 6*a*, 6*b* in that are detachably mounted on the leaf assemblies 1, 2.

Figure 2:
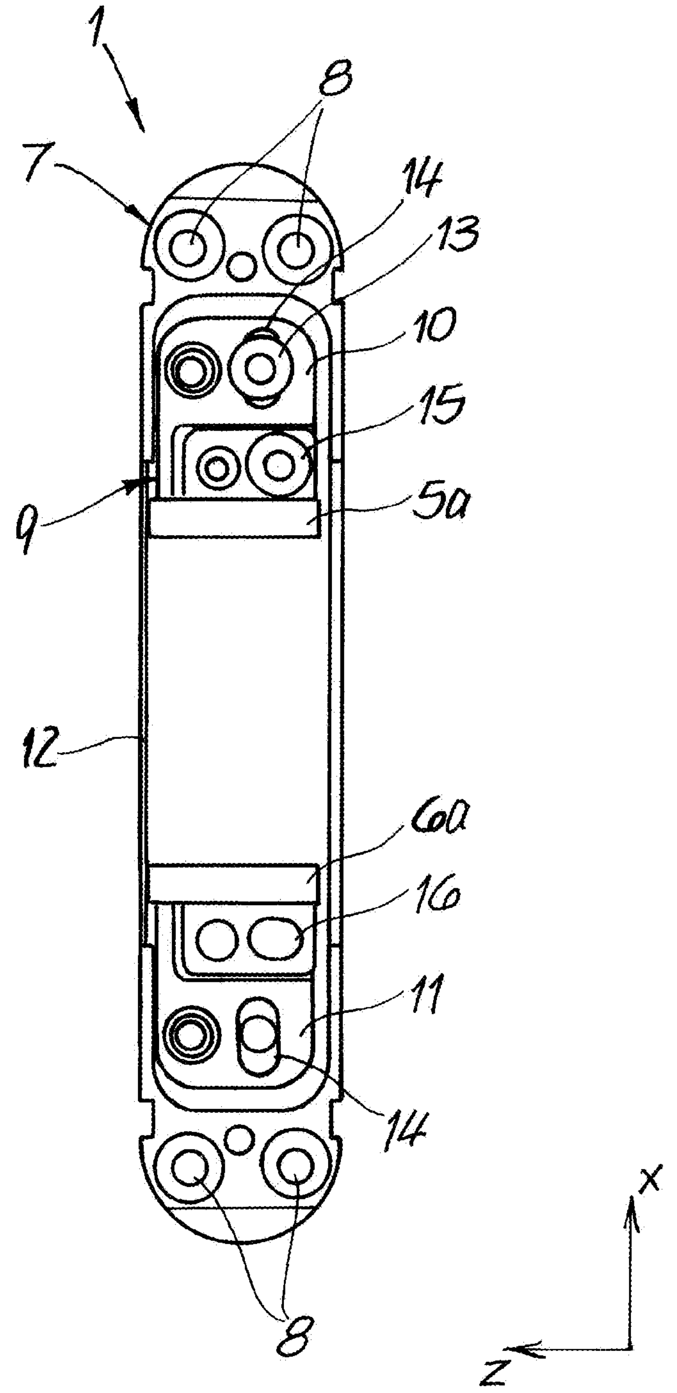
FIG. 2 is a detail front view of the first leaf assembly.

In the context of the invention, the design of the leaf assembly 1 is of particular significance and is shown in detail in FIG. 2. It is clear this leaf assembly 1 essentially has four detachably interconnected components. Thus, first of all, there is a base frame 7 is provided that is secured through holes 8 to the door panel. The frame 7 thus forms a housing holding the further components. A cavity of the base frame 7 holds a seat block 9 that is formed from an upper section 10, a lower section 11 and a middle section 12. It is thus a one-piece component that is fixed via screw fasteners 13 to the base frame 7. In this context it is noted that the view of FIG. 2 only shows fasteners in the upper half of the illustrated leaf assembly 1, whereas screw fasteners 13 are also provided for the lower half.

In order that the seat block 9 can be adjusted along the first direction x, the screw fastener or fasteners 13 are guided in respective firsts slot 14 that are elongated in the first direction x and whose lengths define the possible adjustment paths. Also the mounts 5, 6 are fastened via second screw fasteners 15 at second slots 16 to the seat block 9, the second slot 16 extending in a third horizontal direction z perpendicular to a plane of the door panel, so that adjustment in this third direction z is enabled.

Figure 3:
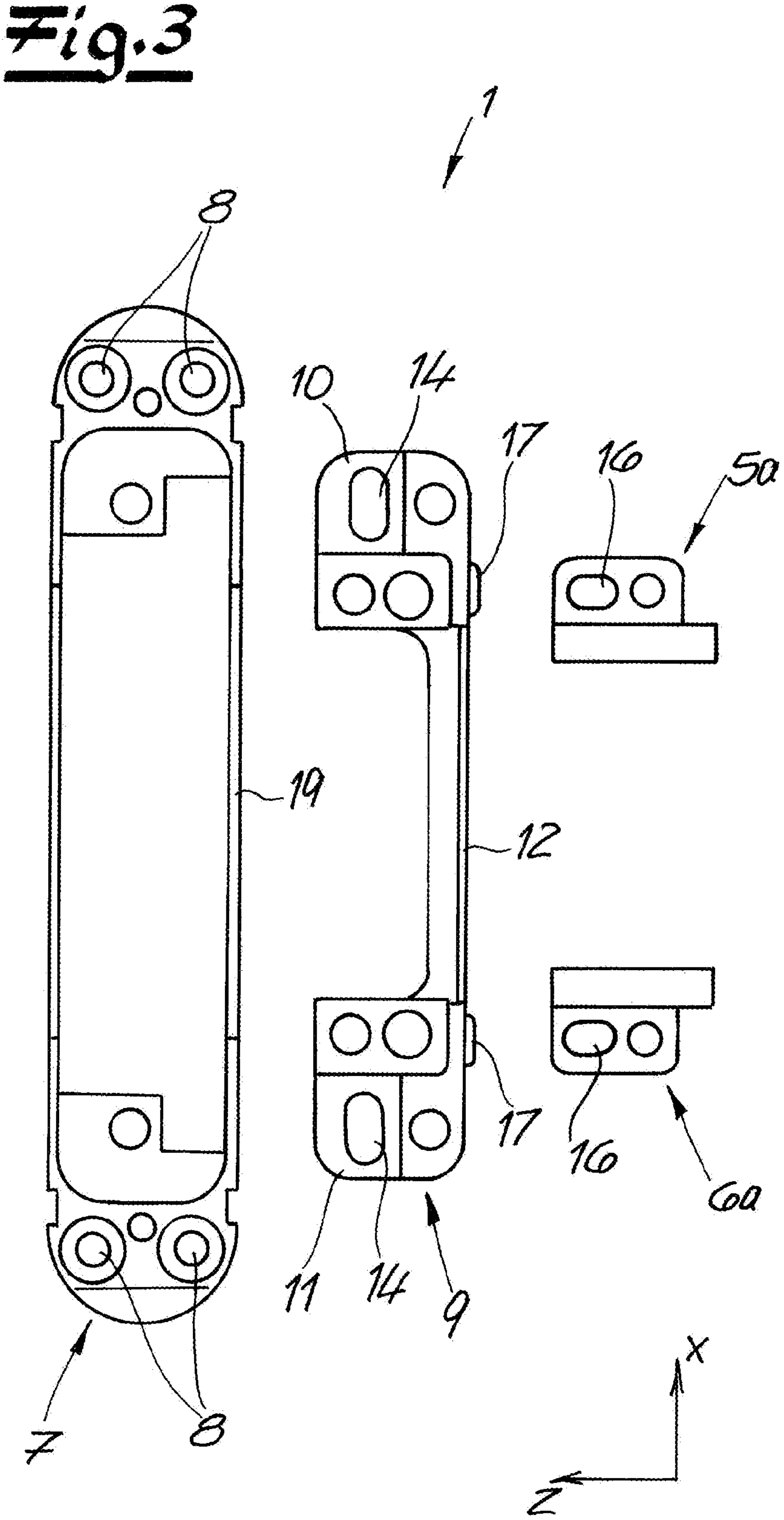
FIG. 3 is a front view of the essential components of the first leaf assembly.
Figure 4:
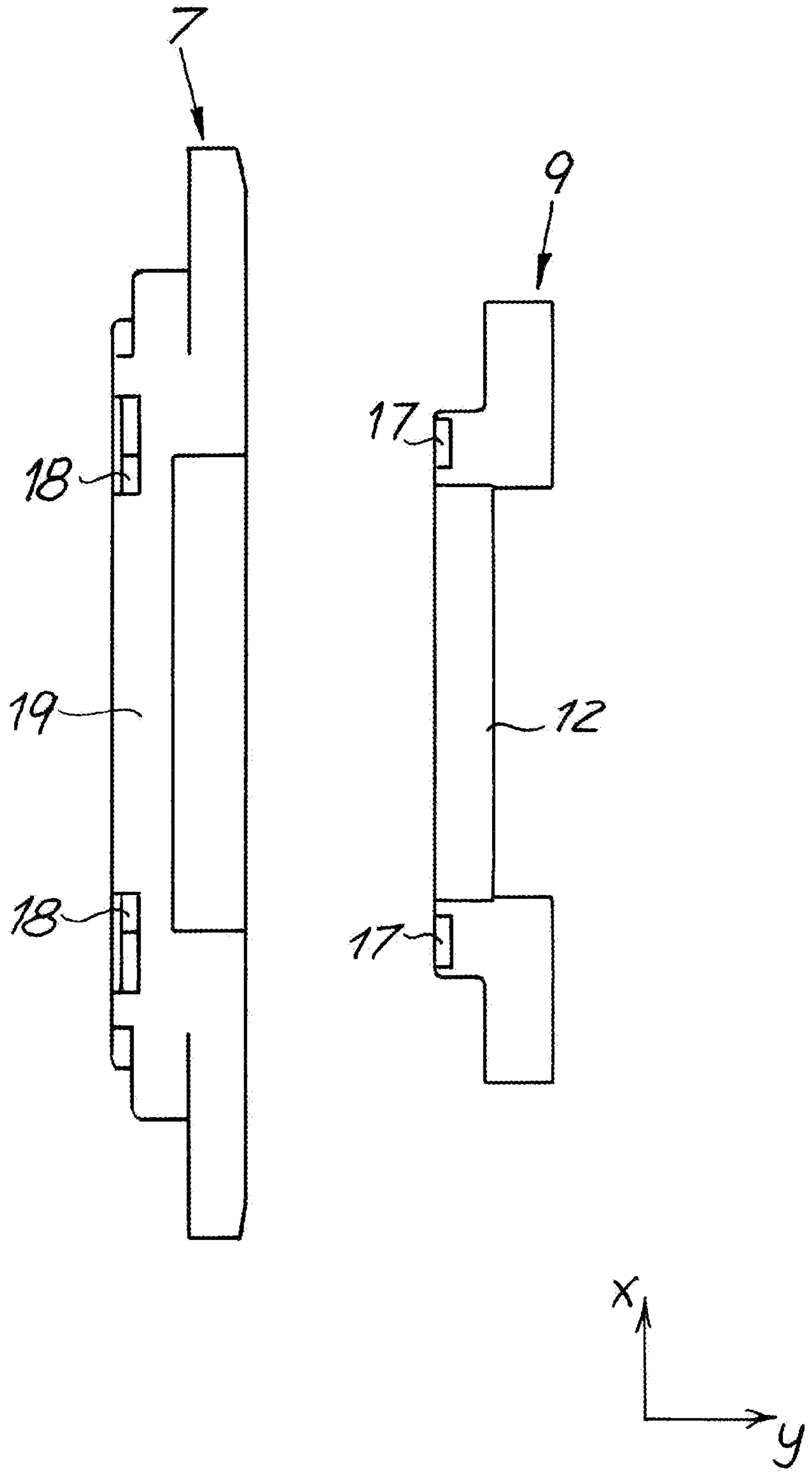
FIG. 4 is a side view of the base frame and the seat block of the first leaf assembly.

A special feature of the first leaf assembly 1 is the manner and how the seat block 9 is held on the base frame 7. This can be determined in particular from a comparison of FIGS. 3 and 4, where FIG. 3 shows the essential components of the first leaf assembly 1, namely the base frame 7, the seat block 9 and the mounts 5*a* and 6*a* in side exploded view in a second direction y parallel to the door panel. FIG. 4 clarifies on the other hand a different side view without mounts 5*a* and 6*a* It becomes clear that the seat block has laterally projecting formations 17 that fit complementarily in grooves 18 of the base frame 7 and for inhibiting relative movement in the second horizontal direction y. Here the ridge formations 17 and the grooves 18 are so dimensioned displacement of the seat block in the first direction x is possible. The positive fit in the second direction y prevents the seat block 9 from tilting in the base frame 7 after loosening of the screw fasteners 13.

Although the grooves 18 can be formed in different ways, in the illustrated embodiment they are openings in the lateral wall 19 of the base frame 7.

FIG. 4 clearly shows that both the base frame 7 as well as the seat block 9 are formed as stepped bodies with the slots 14 formed in projecting upper and lower sections of the seat block 9.

I claim:

1. A door hinge comprising:
- a first leaf assembly having a base frame;
- a second leaf assembly;
- a link connecting the leaf assemblies for pivoting relative to each other about an axis;
- a seat block in the first leaf assembly and on which a first end of the link is pivoted, the seat block being movable in the base frame for adjustment in a first direction parallel to the axis; and
- a guide formation in the seat block for preventing movement of the seat block in a second direction relative to the base frame.

2. The door hinge according to claim 1, wherein the base frame has at least one groove extending in the first direction and in which the guide formation engages, the groove having a greater length than a length of the guide formation for a slide fit.

3. The door hinge according to claim 2, wherein the groove is an opening in the base frame.

4. The door hinge according to claim 2, wherein the groove is formed in a lateral wall of the base frame.

5. The door hinge according to claim 2, wherein at least two grooves are provided, in each of which a respective guide formation of the seat block engages.

6. The door hinge according to claim 5, wherein the grooves each have a length of between 8 and 20 mm.

7. The door hinge according to claim 5, wherein the grooves are spaced from each other in the first direction, the spacing being between 40 and 70 mm.

8. The door hinge according to claim 1, wherein the guide formation has a length of between 5 and 10 mm.

9. The door hinge according to claim 1, further comprising:
- a screw fastener for locking the seat block to the base frame.

10. The door hinge according to claim 9, wherein the seat block has at least one slot in which in a loosened state the respective screw fastener is guided along the first direction.

11. The door hinge according to claim 1, further comprising:
- upper and lower mounts detachably fastened to the seat block, the link being rotatably supported on the mounts.

12. The door hinge according to claim 1, wherein the first direction is transverse to the second direction.

13. The door hinge according to claim 12, wherein the first direction is vertical and the second direction is horizontal.

14. A door hinge comprising:
- a first leaf assembly having a base frame formed with two grooves;
- a second leaf assembly;
- a link connecting the leaf assemblies pivotally to each other;
- a seat block in the first leaf assembly and on which a first end of the link is pivoted, the seat block being movable in the base frame for adjustment in a first direction; and
- respective guide formations in the seat block engaging said grooves, and each of the grooves having a length greater than a length of the respective guide formation for a slide fit and for preventing movement of the seat block in a second direction relative to the base frame.

* * * * *